United States Patent
Tirumalai et al.

(10) Patent No.: US 8,646,177 B2
(45) Date of Patent: Feb. 11, 2014

(54) METHOD AND APPARATUS FOR MOUNTING A ROTOR BLADE ON A WIND TURBINE

(75) Inventors: Suresh S. Tirumalai, Simpsonville, SC (US); Bharat Bagepalli, Niskayuna, NY (US); Kurt J. Goodwin, Greer, SC (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 12/961,722

(22) Filed: Dec. 7, 2010

(65) Prior Publication Data
US 2011/0138626 A1    Jun. 16, 2011

(51) Int. Cl.
*B21K 25/00* (2006.01)
*B21D 53/78* (2006.01)
*B21K 1/36* (2006.01)

(52) U.S. Cl.
USPC ................. 29/889.21; 29/889.2; 29/23.51

(58) Field of Classification Search
USPC .......... 29/889.21, 889.1, 700, 23.51, 889, 29/889.2; 416/146 R, 169 R, 32, 244 R, 416/244 A, 245 R, 205, DIG. 6; 415/18, 123, 415/2.1, 4.3, 4.5, 905, 908; 74/411.5; 290/1 C, 44, 55; 310/83, 118; 322/10, 322/40, 113; 475/149
See application file for complete search history.

(56) References Cited

U.S. PATENT DOCUMENTS

| | | | | |
|---|---|---|---|---|
| 7,736,125 | B2 * | 6/2010 | Bagepalli et al. | 415/126 |
| 8,120,198 | B2 * | 2/2012 | Pabst et al. | 290/55 |
| 2004/0253109 | A1 | 12/2004 | Wobben | |
| 2006/0228220 | A1 | 10/2006 | Wobben | |
| 2011/0135481 | A1 * | 6/2011 | Koronkiewicz | 416/220 R |
| 2012/0045340 | A1 * | 2/2012 | Holling et al. | 416/220 R |
| 2012/0137481 | A1 * | 6/2012 | Lindberg et al. | 29/23.51 |

OTHER PUBLICATIONS

Swedish Patent Application Serial No. 0950152-9 filed on Mar. 13, 2009.

* cited by examiner

*Primary Examiner* — David Bryant
*Assistant Examiner* — Jun Yoo
(74) *Attorney, Agent, or Firm* — Dority & Manning, PA

(57) ABSTRACT

An installation system and a method for mounting a rotor blade to a hub on a wind turbine are disclosed. The method includes coupling a rotor and a stator together, the rotor rotatably connected to the hub. The method further includes rotating the stator in a first direction, wherein rotation of the stator causes the rotor and the hub to rotate in the first direction. The method further includes securing the hub to prevent rotation of the hub. The installation system includes a coupling device configured to releasably couple a stator and a rotor together and a securing device configured to releasably secure the hub. The installation system further includes at least one stator drive device operably connected to the stator, the stator drive device configured to rotate the stator between a first position and a second position.

12 Claims, 5 Drawing Sheets

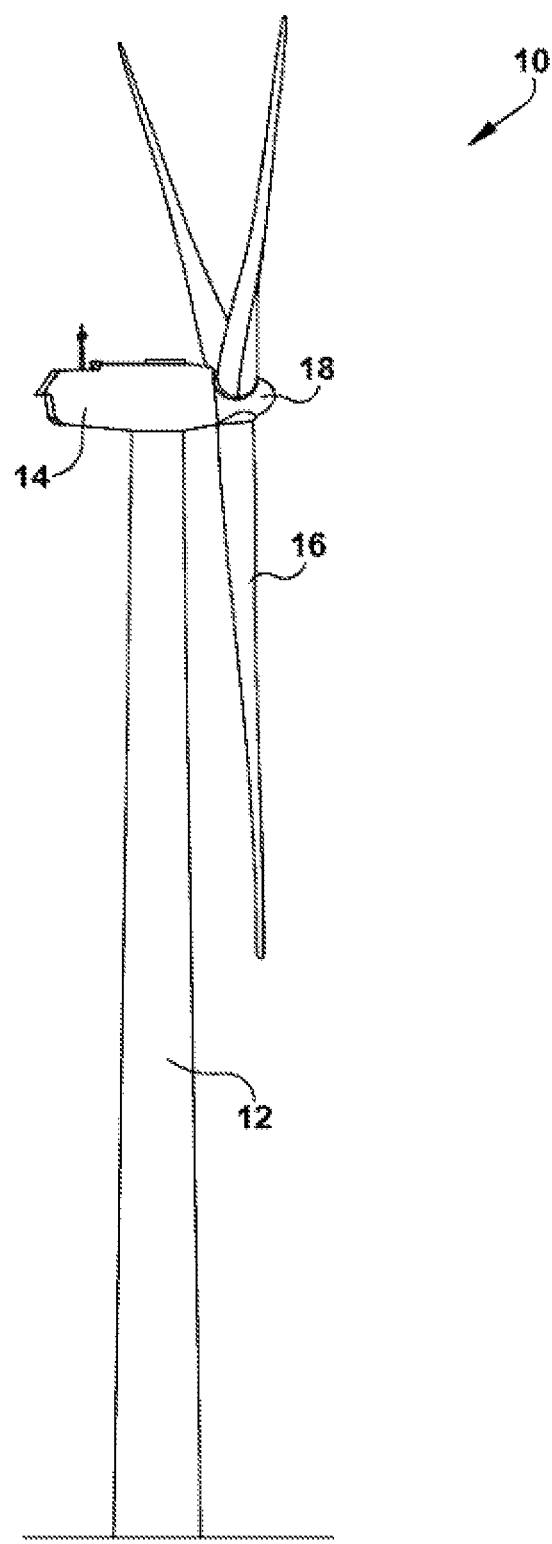
FIG. -1-

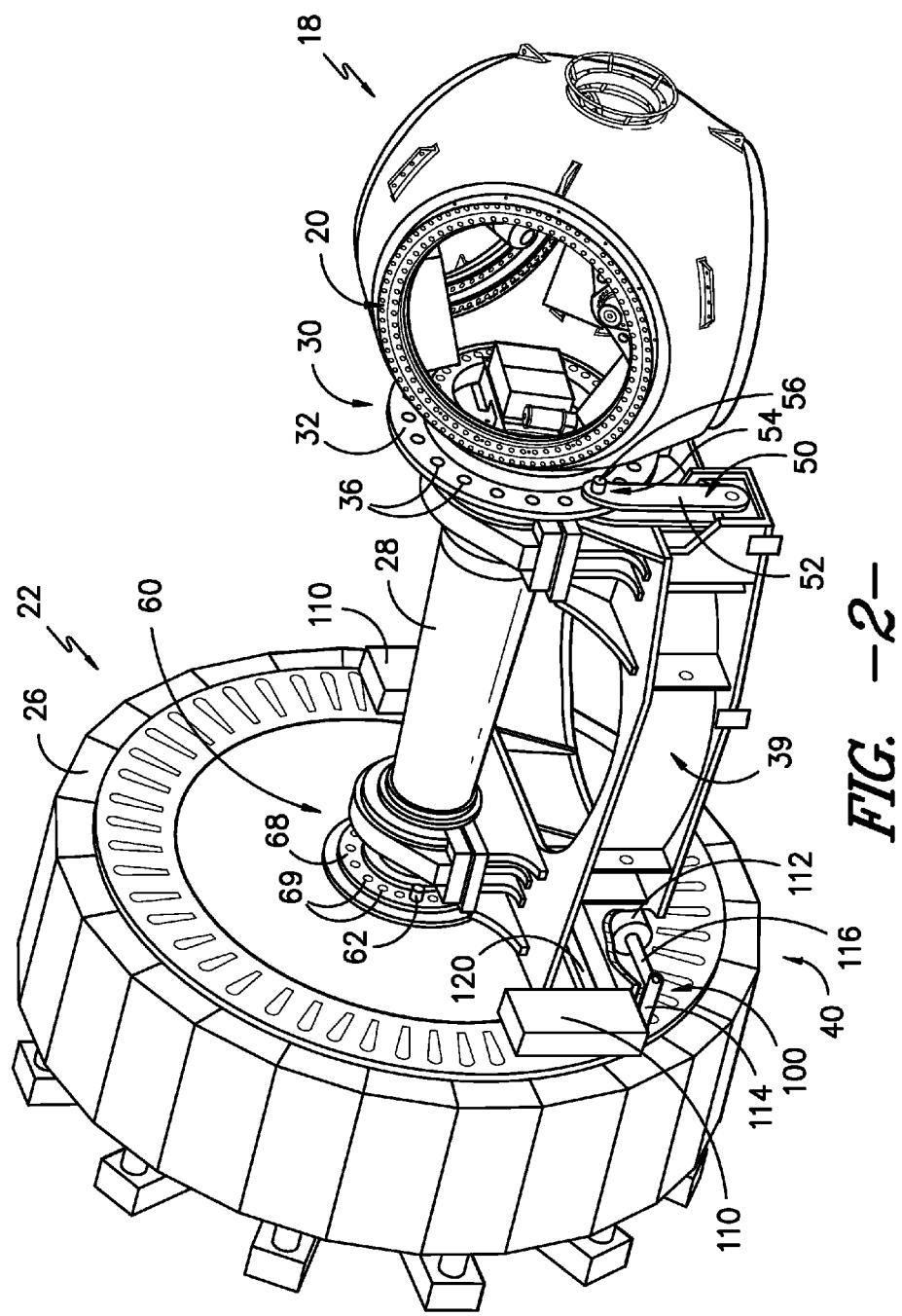
FIG. -2-

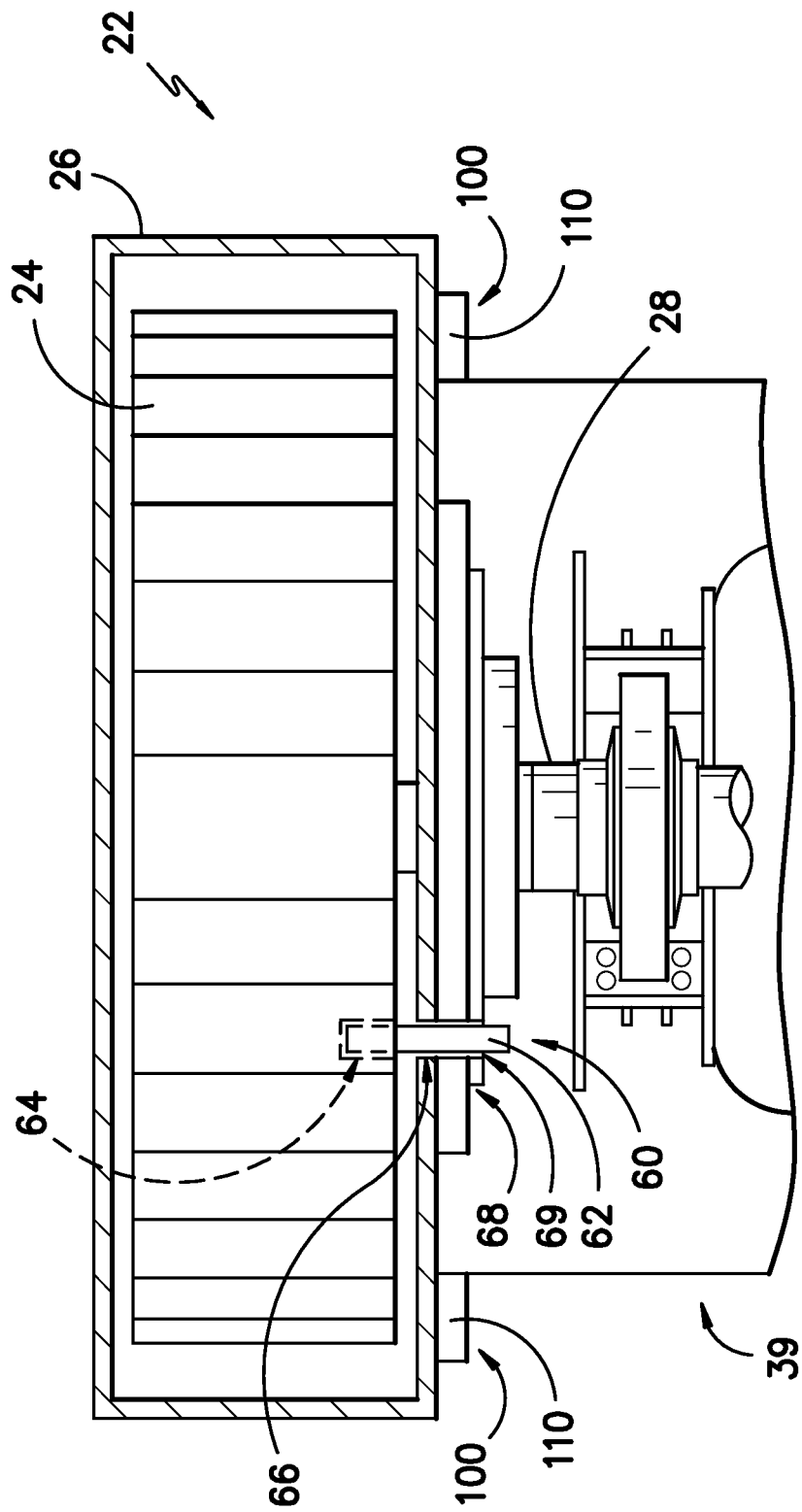

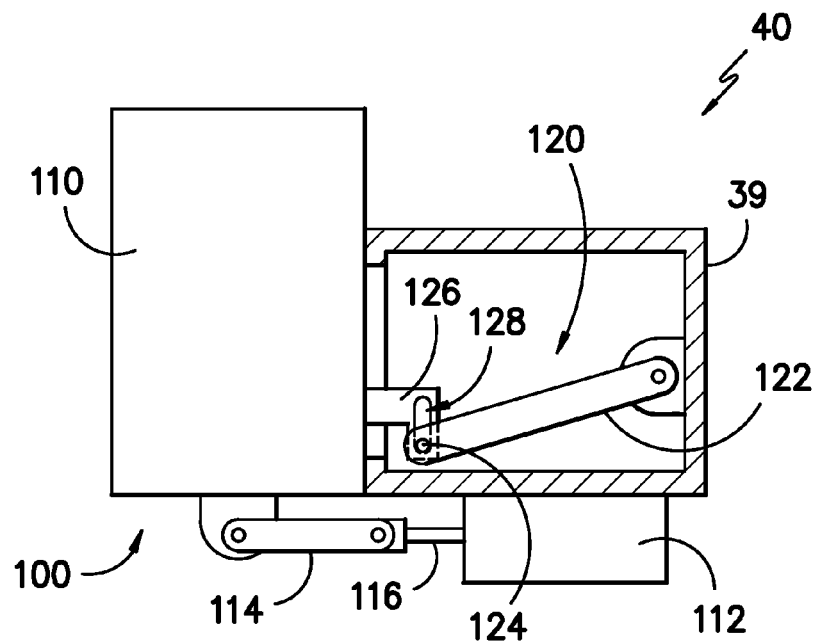
FIG. -4-
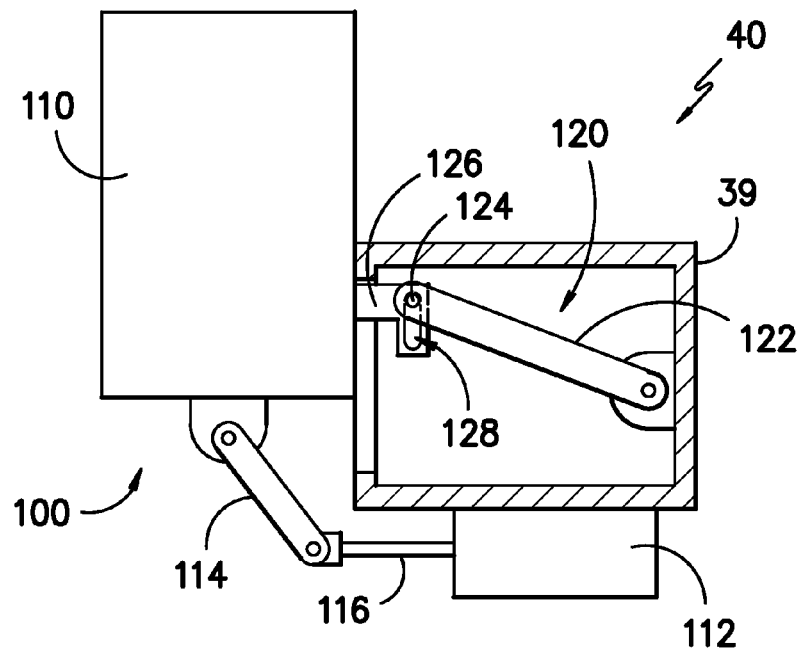
FIG. -5-

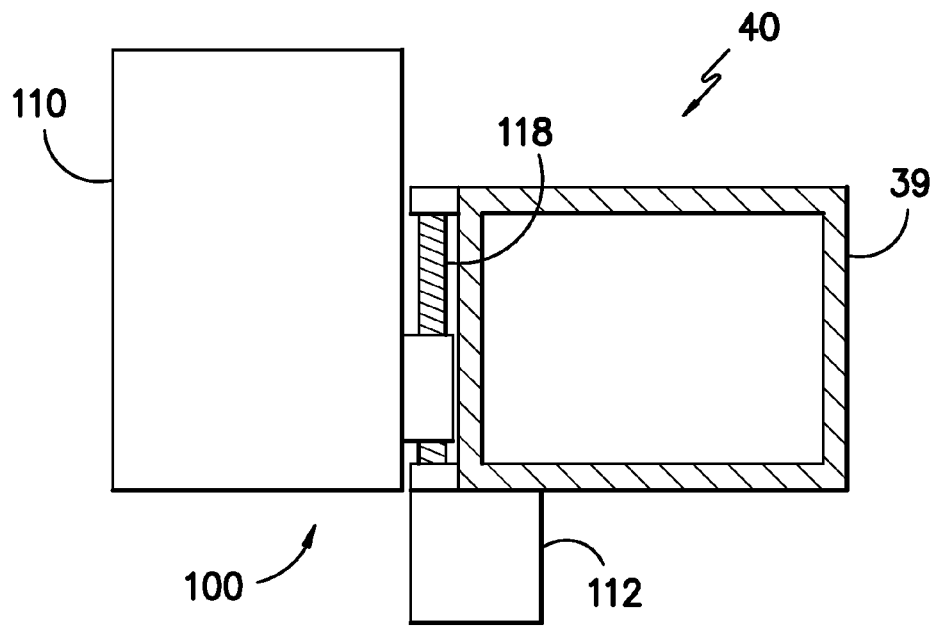
FIG. -6-
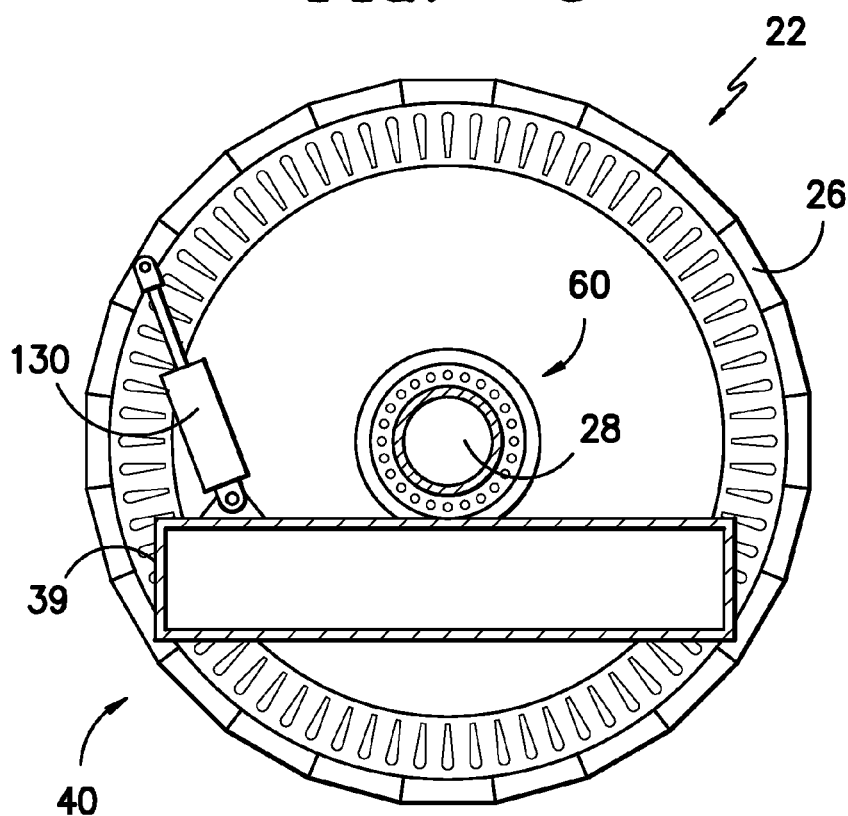
FIG. -7-

US 8,646,177 B2

METHOD AND APPARATUS FOR MOUNTING A ROTOR BLADE ON A WIND TURBINE

FIELD OF THE INVENTION

The present disclosure relates in general to wind turbines, and more particularly to methods and apparatus for mounting rotor blades to wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During construction of a wind turbine, rotor blades must be mounted to a hub of the wind turbine. Typically, this mounting is done on-site at the location of the wind turbine, after transporting the various wind turbine components to the location. As the rotor blades, and the wind turbines in general, increase in size and weight, the task of mounting the rotor blades has become increasingly difficult.

One prior art solution for on-site mounting of the rotor blades is to perform the mounting task before lifting and connecting the hub on the wind turbine tower. However, the hub and rotor blades must then be lifted together and connected on the wind turbine tower. Lifting of the combined hub and rotor blades is difficult, expensive, and time consuming, due to the size and weight of the hub and rotor blades.

Another prior art solution for on-site mounting is to connect the hub on the wind turbine tower and then mount each rotor blade to the hub. For example, each individual rotor blade may be hoisted by a crane or suitable hoisting device and mounted to the hub. However, mounting of the rotor blades to the hub in this manner may be dangerous due to, for example, the imbalance created in the wind turbine after installation of only a portion of the rotor blades.

One prior art attempt to reduce the dangers associated with the imbalances created during mounting of the rotor blades has been to lock the brake disk that is provided in the wind turbine adjacent the hub flange, and then unlock and rotate the brake disk as required to position the hub for mounting of the various rotor blades. A locking device is provided to lock the brake disk, and a rotation device is connected to the brake disk to rotate the brake disk as required for mounting of the rotor blades. However, this system has a variety of disadvantages. For example, the rotation device must impart a large force onto the brake disk to rotate the brake disk, and this force increases as rotor blades are mounted to the hub, which increases the load that must be rotated. Further, as the sizes of the hub and rotor blades increase, even greater forces may be required. Existing systems, in order to adequately rotate the brake disk, are thus large and expensive.

Thus, improved methods and apparatus for mounting a rotor blade to a hub are desired in the art. For example, methods and apparatus that require relatively less force to rotate the hub as desired would be advantageous. Additionally, methods and apparatus that are cost-effective would be advantageous. Further, methods and apparatus that may be retrofitted to existing wind turbines would be desired.

BRIEF DESCRIPTION OF THE INVENTION

Aspects and advantages of the invention will be set forth in part in the following description, or may be obvious from the description, or may be learned through practice of the invention.

In one embodiment, a method for mounting a rotor blade to a hub on a wind turbine is disclosed. The method includes coupling a rotor and a stator together, the rotor rotatably connected to the hub. The method further includes rotating the stator in a first direction, wherein rotation of the stator causes the rotor and the hub to rotate in the first direction. The method further includes securing the hub to prevent rotation of the hub.

In another embodiment, an installation system for mounting a rotor blade to a hub on a wind turbine is disclosed. The installation system includes a coupling device configured to releasably couple a stator and a rotor together, the rotor operably connected to the hub. The installation system further includes a securing device configured to releasably secure the hub. The installation device further includes at least one stator drive device operably connected to the stator, the stator drive device configured to rotate the stator between a first position and a second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of one embodiment of a wind turbine of the present disclosure;

FIG. 2 is a perspective view of one embodiment of an installation system according to the present disclosure;

FIG. 3 is a top view, including a cross-sectional view of the stator, of one embodiment of an installation system according to the present disclosure;

FIG. 4 is a front view of one embodiment of a stator drive device of the present disclosure in a first position;

FIG. 5 is a front view of one embodiment of a stator drive device of the present disclosure in a second position;

FIG. 6 is a front view of another embodiment of a stator drive device of the present disclosure in a first position; and, FIG. 7 is a front view of yet another embodiment of a stator drive device of the present disclosure in a first position.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

As shown in FIG. 2, the hub 18 may be configured to accept the rotor blades 16 thereon. For example, the hub 18 may include a plurality of blade flanges 20. The blade flanges 20 may be configured to engage mating flanges (not shown) on the rotor blades 16 to mount the rotor blades 16 to the flanges 20, and thus to the hub 18.

The wind turbine 10 may further include a generator 22. In exemplary embodiments, the generator 22 may be disposed in the nacelle 14. The generator 22 may be configured to accept mechanical energy from the rotor blades 16 and hub 18 and convert this energy to electrical energy. For example, the generator 22 may include a rotor 24 and a stator 26. As is known in the art, the rotor 24 is a generally movable component of the generator 22, while the stator 26 is a generally stationary component of the generator 22. It should be understood, however, that the stator 26 may be rotatable as required and as discussed below. The generator 22 in exemplary embodiments may be a permanent magnet generator. However, it should be understood that the generator 22 according to the present disclosure is not limited to permanent magnet generators, and rather that any generator suitable for powering a wind turbine 10 is within the scope and spirit of the present disclosure.

In general, the rotor blades 16 may be configured to rotate the rotor 24 of the generator 22. Thus, the generator 22, such as the rotor 24, may be operably connected to the hub 18. Operation of the rotor blades 16 rotates the hub 18, which rotates the rotor 24. A shaft 28 may provide the operable connection between the rotor 24 and the hub 18. Further, in exemplary embodiments, the rotor 24 may be a direct drive rotor 24. In these embodiments, the hub 18 directly drives the rotor 24 through the shaft 28, with no gearing or other components therebetween. Alternatively, however, the rotor 24 may be indirectly driven by the hub 18. For example, gearing or other suitable components may be provided between the rotor 24 and the hub 18 to translate the rotation of the hub 18 to rotation of the rotor 24.

As shown in FIG. 2, a rotor brake 30 may further be provided in the wind turbine 10. The rotor brake 30 may be configured to brake the hub 18 and rotor 24 as required, such as before, during, or after operation of the wind turbine 10. The rotor brake 30 may include, for example, a brake disk 32 and a braking mechanism (not shown). The brake disk 32 may be operably connected to the hub 18 and rotor 24. Thus, rotation of the hub 18 and rotor 24 may cause the brake disk 32 to rotate. In exemplary embodiments, as shown in FIG. 2, the rotor disk 32 may be provided on an end of the shaft 28 distal from the rotor 24 and proximate the hub 18. The braking mechanism may be configured to releasably engage the rotor disk 32 as required to brake the rotor disk 32, and thus brake the hub 18 and rotor 24. For example, the braking mechanism may include a pad or plurality of pads, and/or may include any suitable braking components. The rotor brake 30 may further include a plurality of bore holes 36. The bore holes 36 may, for example, be defined in an annular array about the brake disk 32. The bore holes 36 may be configured for engagement with a securing device, as discussed below, to releasably secure the hub 18.

As shown, a bed plate 39 may be provided in the wind turbine 10. The bed plate 39 may generally provide support for various components of the wind turbine 10, such as the generator 22, shaft 28, rotor brake 30, and other components as discussed below.

During mounting of rotor blades 16 to the hub 18, rotation of the hub 18 must be controlled such that the hub 18 is stationary when required and rotatable when required. For example, the hub 18 should be stationary when a rotor blade 16 is being mounted to the hub 18, and should further be rotatable after mounting a rotor blade 16 to enable mounting of other rotor blades 16 to the hub 18.

Thus, an installation system 40 is provided for mounting a rotor blade 16 on a wind turbine 10. In particular, the installation system 40 may be provided for mounting the rotor blade 16 to the hub 18 on the wind turbine 10. The installation system 40 according to the present disclosure may advantageously require relatively little force to rotate the hub 18 due to large moments created by operation of the installation system 40. These large moments may cause relatively small forces generated by the installation system 40 to translate into relatively larger forces applied to the hub 18 to rotate the hub 18. Further, the installation system 40 may be relatively cost-effective, and may be retrofitted into existing wind turbines 10 if desired. Additionally, it should be understood that the installation system 40 is not limited to use for mounting a rotor blade 16 on a wind turbine 10, and rather that the installation system 40 may be utilized for any suitable purpose such as, for example, conducting inspection or maintenance operations within the nacelle 14 of the wind turbine 10.

The installation system 40 may include, for example, the hub 18. Further, the installation system 40 may include the generator 22.

In exemplary embodiments, the installation system 40 may include a securing device 50. The securing device 50 may be configured to releasably secure the hub 18. When secured by the securing device 50, the hub 18 may be locked and prevented from rotating, thus allowing a rotor blade 16 to be safely mounted to the hub 18. In exemplary embodiments as shown in FIG. 2, the securing device 50 may be configured to engage the rotor brake 30. For example, the securing device 50 may include a support member 52 or plurality of support members 52, a securing bore 54 or plurality of securing bores 54, and a pin 56 or plurality of pins 56. The support member 52 may be, for example, a shaft, rib, or other suitable protrusion. The securing bores 54 may be defined in or adjacent to the support member 52. The securing bores 54 may be configured to mate with a bore hole 36 or multiple bore holes 36 defined in the rotor disk 32 of the rotor brake 30. For example, the securing bores 54 and bore holes 36 may be configured to accept the pin 56 or plurality of pins 56 therethrough.

Thus, to secure the hub 18, a pin 56 or pins 56 may be inserted into mating securing bores 54 and bore holes 36. Acceptance of a pin 56 by a mating securing bore 54 and bore hole 36 may prevent rotation of the rotor disk 32, thus securing the hub 18. Removal of the pin 56 or pins 56 may release the rotor disk 32 from the securing device 50, thus releasing the hub 18 and again allowing rotation thereof. Operation of the pins 56 to engage and disengage the securing bores 54 and bore holes 36 may be performed manually or may be automated, as desired.

It should be understood that the securing device 50 of the present disclosure is not limited to the above disclosed embodiments. For example, the securing device 50 need not engage a rotor disk 32 or rotor brake 30 to releasably secure the hub 18. Rather, any suitable securing device configured to releasably secure the hub 18 is within the scope and spirit of the present disclosure.

In exemplary embodiments, the installation system 40 may further include a coupling device 60. The coupling device 60 may be configured to releasably couple the stator 26 and rotor 24 together. When coupled together, the stator 26 and rotor 24 are prevented from movement independently of each other. Further, when coupled together, rotation of the stator 26 causes rotation of the rotor 24 and vice-versa. In exemplary embodiments, as shown in FIGS. 2 and 3, the coupling device 60 may include a pin 62 or pins 62. Further, the rotor 24 and stator 26 may each define a plurality of bore holes 64 and 66, respectively. The bore holes 64 and 66 may, for example, be defined in an annular array about the rotor 24 and stator 26. The bore holes 64, 66 may be configured for engagement with the coupling device 60 to releasably couple the stator 26 and rotor 24 together. For example, in exemplary embodiments, the bore holes 64, 66 may be configured to accept the pins 62 therein. In some embodiments, the coupling device 60 may further include a collar 68 and a plurality of coupling bores 69. The coupling bores 69 may be defined in the collar 68, such as in an annular array about the collar 68. The coupling bores 69 may be configured to mate with the bore holes 64 and 66 defined in the rotor 24 and stator 26.

Thus, to couple the stator 26 and rotor 24 together, a pin 62 or pins 62 may be inserted into mating bore holes 64, 66 and, optionally, mating coupling bores 69. Acceptance of a pin 62 therein by a mating bore hole 64 and bore hole 66 may prevent independent rotation of the rotor 24 and stator 26, thus coupling the rotor 24 and stator 26 together. Removal of the pin 62 or pins 62 may release the rotor 24 from the stator 26, allowing independent rotation. Operation of the pins 62 to couple and release the stator 24 and rotor 26 may be performed manually or may be automated, as desired.

It should be understood that the coupling device 60 of the present disclosure is not limited to the above disclosed embodiments. Rather, any coupling device configured to releasably couple the stator 26 and rotor 24 together is within the scope and spirit of the present disclosure.

In exemplary embodiments, the installation system 40 may further include a stator drive device 100, or a plurality of stator drive devices 100. The stator drive device 100 may be configured to rotate the stator 26 between a first position and a second position, as shown in FIGS. 4 through 7. The first position, in general, is the position in which the stator 26 is generally disposed. For example, before and after mounting of the rotor blades 16 to the wind turbine 10, and during operation of the wind turbine 10, the stator 26 may be disposed in the first position. The second position is either clockwise or counterclockwise from the first position, as desired. The stator 26 may be rotated to the second position, as discussed below, during mounting of a rotor blade 16 to the wind turbine 10.

In one embodiment, as shown in FIGS. 4 through 6, the stator drive device 100 may include a torque arm 110 and an actuator 112. The torque arm 110 may be operably connected to the stator 26, such that movement of the torque arm 110 causes rotation of the stator 26. The torque arm 110 may be connected to the stator 26 through a rod or other suitable mechanical fastener, or through any suitable connection device.

The actuator 112 may be configured to actuate the torque arm 110. The actuator 112 may, for example, be mounted to the bed plate 39 and connected to the torque arm 110. Actuation of the torque arm 110 may thus cause the torque arm 110 to move. For example, the actuator 112 may be a piston, such as a hydraulic or pneumatic piston, or any other suitable actuation device. Movement of the torque arm 110 caused by the actuator may be in a generally linear path, a generally rotational path, or any suitable path as required. When operably connected to the stator 26, movement of the torque arm 110 may cause the stator 26 to move between the first position and the second position.

In some embodiments, as shown in FIGS. 4 and 5, the stator drive device 100 may further include a linkage 114. The linkage 114 may operably connect the torque arm 110 and the actuator 112. The linkage 114 may allow for the required movement of the torque arm 110 upon actuation of the actuator 112. For example, as shown in FIGS. 4 and 5, when the actuator 112 according to these embodiments is actuated, the actuator or a component thereof may translate. For example, a shaft 116 of the actuator 112 may move in a generally translational manner when actuated. The linkage 114 may be disposed between and connect the actuator 112 and the torque arm 110, and may thus pivot as require to translate the movement of the actuator 112 into movement of the torque arm 110.

In other embodiments, as shown in FIG. 6, the stator drive device 100 may further include a worm gear 118. The worm gear 118 may operably connect the torque arm 110 and the actuator 112. The worm gear 118 may allow for the required movement of the torque arm 110 upon actuation of the actuator 112. For example, when the actuator 112 according to these embodiments is actuated, the actuator or a component thereof may rotate. In exemplary embodiments, the shaft 116 of the actuator 112 may rotate when actuated. The worm gear 118 may be disposed between and connect the actuator 112 and the torque arm 110. When the actuator 112 is actuated, rotation of the actuator may cause rotation of the worm gear 118, which may move the torque arm 110.

As shown in FIGS. 4 and 5, the stator drive device 100 may further include a linking mechanism 120 for connecting the torque arm 110 to the bed plate 39. In some exemplary embodiments, the linking mechanism 120 may be a scotch-yoke linking mechanism, as shown. In these embodiments, the linking mechanism 120 may include a linkage 122, the linkage 122 including a pin 124 disposed on an end of the linkage 122, and a yoke 126, the yoke 126 defining a slot 128. The linkage 122 may be connected to the bed plate 39, and the yoke 126 may be connected to the torque arm 110. The pin 124 and slot 128 may be in operable connection, as is generally known in the art. It should be understood, however, that the present disclosure is not limited to scotch-yoke linking mechanisms, and rather that any suitable linking mechanisms are within the scope and spirit of the present disclosure. The linking mechanism 120 may thus connect the torque arm 110 to the bed plate 39. The linking mechanism 120 may extend through the bed plate 39, as shown, and allow for movement of the torque arm 110 with respect to the bed plate 39.

In another embodiment, as shown in FIG. 7, the stator drive device 100 may include an actuator 130. The actuator 130 may be operably connected to the stator 26, such that movement of the actuator 130 causes rotation of the stator 26. The actuator 130 may be connected to the stator 26 through a rod or other suitable mechanical fastener, or through any suitable connection device.

Further, the actuator 130 may be configured to actuate the stator 26. The actuator 130 may, for example, be mounted to the bed plate 39. The actuator 130 may be a piston, such as a hydraulic or pneumatic piston, or any other suitable actuation device. When operably connected to the stator 26, movement of the actuator 130 may cause the stator 26 to move between the first position and the second position.

Advantageously, the stator drive device 100 may be operably connected to the outer periphery of the stator 26. By connecting the stator drive device 100 as such, when the stator 26 and rotor 24 are coupled together, operation of the stator drive device 100 may create a moment with respect to the hub 18. Thus, a relatively small force exerted by the stator drive device 100 may be translated to a relatively large force exerted on the hub 18. This mechanical advantage of the stator drive device 100 may thus allow for the hub 18 to be rotated using relatively little force for mounting of rotor blades 16 as required. Additionally, the stator drive device 100, and the installation system 40 in general, may be relatively inexpensive, and may be retrofittable on existing wind turbines 10.

As mentioned, more than one stator drive device 100 may be provided in the installation system 40. Each stator drive device 100 may be configured to rotate the stator 26 between a first position and a second position. For example, in some embodiments, two stator drive devices 100 may be provided. The stator drive devices 100 may generally be disposed on opposing sides of the generator 20. One or both stator drive devices 100 may be configured to rotate the stator 26.

Thus, the installation system 40 may be utilized to mount a rotor blade 16 on a wind turbine 10, such as to a hub 18 on a wind turbine 10. For example, when the rotor 24 and stator 26 are coupled together, the stator drive device 100 may be utilized to rotate the stator 26, and thus the rotor 24 and the hub 18, in a first direction from the first position to the second position. As discussed above, the moment created by the stator drive device 100 may allow for the stator 26, and thus the hub 18, to be easily and efficiently rotated. When the stator 26 is in the second position, the hub 18 may be secured. Securing the hub 18 prevents movement of the hub 18, allowing a rotor blade 16 to then be mounted to the hub 18. This process may be repeated as required to mount all required rotor blades 16 to the hub 18.

The present disclosure is further directed to a method for mounting a rotor blade 16 to a hub 18 on a wind turbine 10. It should be understood, however, that the method is not limited to use for mounting a rotor blade 16 on a wind turbine 10, and rather that the method may be utilized for any suitable purpose such as, for example, conducting inspection or maintenance operations within the nacelle 14 of the wind turbine 10. The method includes, for example, coupling the rotor 24 and the stator 26 together. As discussed above, the rotor 24 may be rotatably connected to the hub 18. In exemplary embodiments, as discussed above, a coupling device 60 may be utilized to couple the rotor 24 and stator 26 together.

The method further includes, for example, rotating the stator 26 in a first direction. Rotation of the stator 26 in the first direction may rotate the stator 26 from the first position to the second position, as discussed above. Further, rotation of the stator 26 may cause the rotor 24 and the hub 18 to rotate in the first direction. In exemplary embodiments, a stator drive device 100 or a plurality of stator drive devices 100 may be utilized to rotate the stator 26. Thus, the rotating step may comprise operating at least one stator drive device 100.

The method further includes, for example, securing the rotor 24 to prevent rotation of the hub 18. As discussed above, securing the hub 18 prevents rotation of the hub 18. In exemplary embodiments, a securing device 50 may be utilized to secure the hub 18.

In some embodiments, the method may further include the step of attaching a rotor blade 16 to the hub 18. As discussed above, the hub 18 may include various flanges 20. The flanges 20 may be configured to engage mating flanges (not shown) on the rotor blades 16 to mount the rotor blades 16 to the hub 18. The rotor blades 16 may, for example, be hoisted by a crane to the location of the hub 18, and the mating flanges may then be engaged by the flanges 20. However, it should be understood that the present disclosure is not limited to this method for attaching a rotor blade 16 to a hub 18, and rather that any attachment method is within the scope and spirit of the present disclosure.

In some embodiments, the method may further include the step of releasing the rotor 24 from the stator 26. As discussed above, releasing the rotor 24 from the stator 26 may allow the rotor 24 to rotate independently of the stator 26. In exemplary embodiments, as discussed above, the coupling device 60 may be utilized to release the rotor 24 from the stator 26.

In some embodiments, the method may further include the step of rotating the stator 26 in a second opposite direction. Rotation of the stator 26 in the second direction may rotate the stator 26 from the second position to the first position. Further, in exemplary embodiments, this rotating step may occur when the hub 18 has been secured and the rotor 24 has been released from the stator 26. Thus, the rotor 24 and hub 18 may remain in position for mounting of a rotor blade 18, while the stator 26 is rotated in the second direction to the first position.

In exemplary embodiments, after the stator 26 is rotated in the second opposite direction and is again disposed in the first position, the method according to the present disclosure may be repeated as required. For example, the rotor 24 and stator 26 may be coupled together and, after unsecuring the hub 18 to allow rotation of the hub 18, the stator 26 may again be rotated in the first direction. Further movement of the stator 26, after coupling of the stator 26 and rotor 24, may further rotate the rotor 24 to allow for attaching of additional rotor blades 16. Thus, the present method and apparatus allow for easy and efficient mounting of rotor blades 16 on wind turbines 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An installation system for mounting a rotor blade to a hub on a wind turbine, the installation system comprising:
    a coupling device configured to releasably couple a stator and a rotor of a generator together, the rotor operably connected to the hub by a shaft,
    a securing device configured to releasably secure the hub; and at least one stator drive device directly and operably connected to the stator, the stator drive device configured to rotate the stator between a first position and a second position.

2. The installation system of claim 1, wherein the stator drive device comprises a torque arm and an actuator, the torque arm operably connected to the stator, the actuator configured to actuate the torque arm.

3. The installation system of claim 2, wherein the stator drive device further comprises a worm gear operably connecting the torque arm and the actuator.

4. The installation system of claim 2, wherein the stator drive device further comprises a linkage operably connecting the torque arm and the actuator.

5. The installation system of claim 1, wherein the stator drive device comprises an actuator, the actuator operably connected to the stator and configured to actuate the stator.

6. The installation system of claim 1, wherein the rotor is a direct drive rotor.

7. The installation system of claim 1, wherein the at least one stator drive device is a plurality of stator drive devices.

8. A wind turbine assembly, the wind turbine assembly comprising:
a hub configured to accept the rotor blade thereon;
a generator, the generator comprising a rotor and a stator, the rotor operably connected to the hub by a shaft; and
an installation system, the installation system comprising:
a coupling device configured to releasably couple the stator and the rotor together;
a securing device configured to releasably secure the hub; and
at least one stator drive device directly and operably connected to the stator, the stator drive device configured to rotate the stator between a first position and a second position.

9. The wind turbine assembly of claim 8, wherein the stator drive device comprises a torque arm and an actuator, the torque arm operably connected to the stator, the actuator configured to actuate the torque arm.

10. The wind turbine assembly of claim 9, wherein the stator drive device further comprises a worm gear operably connecting the torque arm and the actuator.

11. The wind turbine assembly of claim 9, wherein the stator drive device further comprises a linkage operably connecting the torque arm and the actuator.

12. The wind turbine assembly of claim 8, wherein the stator drive device comprises an actuator, the actuator operably connected to the stator and configured to actuate the stator.

* * * * *